United States Patent Office
3,737,353
Patented June 5, 1973

3,737,353
METHOD OF PRODUCING RIBBED TUBES OF REINFORCED SETTING PLASTIC MATERIAL
Agnar Gilbu, Sandefjord, Norway, assignor to Vera Fabrikker A/S, Sandefjord, Norway
Filed Feb. 12, 1971, Ser. No. 114,888
Claims priority, application Norway, Feb. 18, 1970, 586/70
Int. Cl. B65h 81/00
U.S. Cl. 156—190                3 Claims

ABSTRACT OF THE DISCLOSURE

A method of manufacturing externally ribbed tubes and pipes where the ribs are of a resilient material which may be compressed by the layers subsequently applied to a mandrel.

---

The present invention relates to a method for producing ribbed tubes of reinforced setting plastic material, where a layer of reinforced setting plastic material is introduced onto a rotating mandrel and a rib-forming profiled band is wound in a helical line upon the said layer of reinforced setting plastic material, a further layer being thereafter applied which covers the first layer and the rib-forming band.

A method for producing corrugated tubes is known where a layer of reinforced setting plastic material is introduced onto a mandrel and upon this is applied a profiled band which is to form ribs on the tube, a new layer of reinforced setting plastic material being applied thereupon. The profile band is of such a type that it can be joined or fused onto the material in the setting plastic layers. The reinforcement in the setting plastic layers consists of continuous strands which are wound upon the mandrel peripherally and/or axially applied. Axial application of a strand-formed reinforcement requires complex equipment and is not particularly desirable therefore. It has proved, however, that reinforcement which is wound upon the mandrel does not give a satisfactory reinforcement in a ribbed tube. As a rule, these ribbed tubes are used where tubes or tanks are to be buried, and it is therefore of great importance to achieve the best possible annular rigidity. When winding reinforcement strands, it proves that the strands become applied to the crests of the ribs and in the spaces between the ribs, little or no reinforcement being applied to the slope from the spaces to the top of the ribs. It is, however, precisely this part of the tube wall which is to constitute the greater part of the annular rigidity.

A further method is known for reinforcing setting plastic tubes for tubes with and without ribs, where both continuous strands (roving), and a glass fibre web of unorientated fibre which is wound onto the mandrel together with the roving, are used as reinforcement. This method is free from problems when concerned with smooth, cylindrical tubes, but problems arise when concerned with corrugated and/or ribbed tubes. This is due to the fact that the winding of the fibre band is carried out in plane with the rib crests and must be forced down into the intermediate spaces between the ribs which causes frequent occurrence of fractures and wrinkles in the glass fibre web when this is to be compacted to a smaller diameter by means of the strands.

The aim of the present invention is to improve the two above described methods by producing a ribbed tube of reinforced setting plastic material on a rotating mandrel in that a layer of reinforced setting plastic material is applied and a rib-forming profile band is wound in helical line thereupon a layer of reinforced setting plastic material being applied thereafter which covers the first layer and the rib-forming band, and the method is characterized in that a band of porous, resilient foam plastic is used as rib-forming band, the characterizing feature of the method resides in the use of a band of resilient foam plastic material as rib-forming band upon which is applied a reinforcement in the form of a fibre web of unorientated fibres and a strand reinforcement which is applied only in the intermediate spaces between the windings of the foam plastic band.

Any type of foam plastic may be used which is not dissolved by the setting plastic material.

The porous foam plastic band is applied to the mandrel by means of a roller which conveys setting plastic material from a bath, and the roller is maintained in pressing relationship against the mandrel so that the foam plastic layer is flattened on application. The reinforcement in the outer layer being applied sufficiently tightly on top of the porous band that the air is pressed out of the band during the application.

A further characterizing feature of the invention resides in the fact that outermost in the outer layer, a reinforcement is wound in the form of a thin web of unorientated fibres which are bonded in such a manner that the said web is not distintegrated by the setting plastic material.

A number of advantages are achieved by means of the method according to the invention. The foam plastic material used for the ribs is pressed flat during the application so that no air pockets occur between the inner layer and the fibre reinforced plastic layer. The fibre material in the fibre web is not torn apart since the binder will not dissolve in the setting plastic material. No wrinkles or folds or ruptures then occur in the reinforcement. If open cells are used, these are filled with polyester and, when the constructed tube is forwarded to the setting zone, exothermic heat will develop in the foam plastic profile. This enhances the supply of heat to the inner layer and thus ensures good setting. A foam plastic of closed cell structure may also be used in the profile band, however, the heat transmission will then be poorer since the band will act as insulation against heat transmission to the inner layer.

The invention is further explained in the following by means of the drawing which in FIG. 1 illustrates, in diagram, the part of the apparatus for production of the tubes according to the invention, where the materials are supplied to the mandrel.

Figure 1:
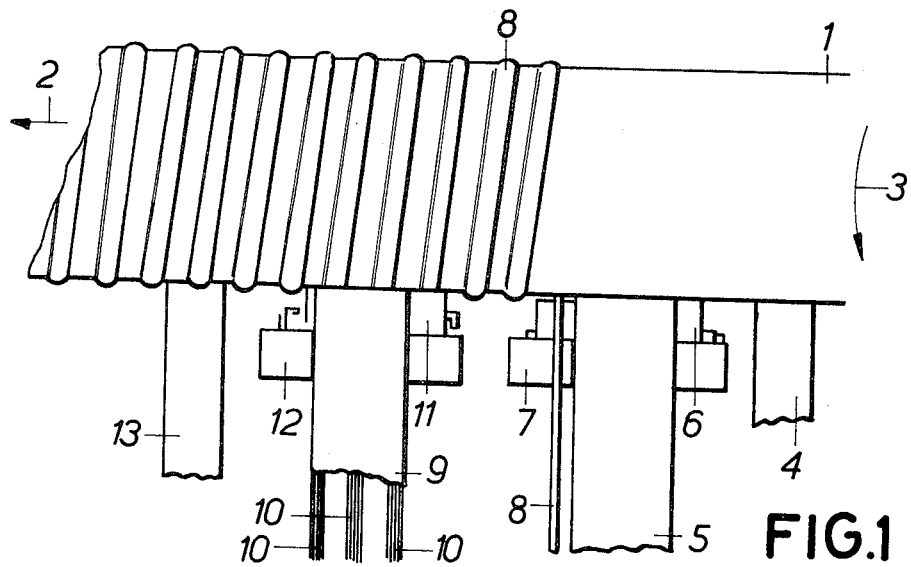

The mandrel 1 is of the type whose surface travels continuously in the direction of the arrow 2 and rotates in the direction of the arrow 3. In order to obtain a smooth interior, a layer is first applied in the form of a band 4. This band may be a so-called synthetic fibre web which does not disintegrate on the action of setting plastic material. Upon this layer, a layer of band-formed fibre web 5 is applied which is impregnated with setting plastic material, for example, polyester, by means of a roller 6 which conveys setting plastic material from a container 7. This band-formed fibre web 5 is rolled in towards the mandrel 1 by means of a roller 6, so that no air bubbles occur. The foam plastic band 8 is introduced to the mandrel 1 over the same roller 6 as the band 5 and asbsorbs setting plastic material in the same manner. Thereafter a new fibre web in the form of a band 9, and reinforcement strands 10 are applied. The said materials 9 and 10 are also rolled in towards the mandrel 1 and the material which has previously been applied thereto, by means of the roller 11 which conveys plastic material from a vessel 12, so that the web 9 and roving 10 are impregnated when they are introduced to the mandrel. The ribbed material 8 is thereby rolled flat during application of the outer setting plastic layer. The strands 10 are not uniformly distributed over the surface of the mandrel but are divided into bundles with the same division as the helically wound foam plastic profile 8. These strand bundles 10 are introduced to the mandrel in the intermediate spaces between the foam plastic profile 8. The bundles 10 of continuous strands are applied radially outside the fibre web 9. In order to prevent the fibre material from sagging on the underside of the mandrel, a thin web belt 13 of stretchable material the elasticity of which is not affected by the setting plastic is finally wound thereupon. The fibres in the web are unorientated and are bonded by a binder which does not dissolve in the setting material. As with the layer 4, the layer 13 is impregnated by means of the setting plastic in the other layers.

During application of the web 9 and the roving 10, the foam plastic profile 8 is rolled flat into the mandrel, so that the tube when it leaves the roller 11 is substantially smooth cylindrical. The setting plastic material in the tube wall is, however, still liquid and the flexibility in the foam plastic profile 8 will cause ribs to be formed during stretching of the fibre web 9. In other words, the ribs are formed by an expansion of the flat pressed foam plastic profile 8 while the tube is in plastic state. This is a much more advantageous manner of making ribs when web reinforcement is to be used in the outer layer, than to attempt to press the web reinforcement down between rigid ribs, when folds and wrinkles will readily occur in the web in the sections between the ribs 8.

Figure 2:
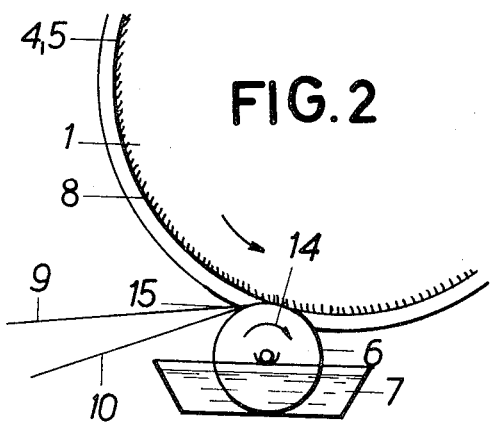
FIG. 2 is a section through a part of the mandrel during construction of a tube, with feed path for the fibre web, and the roller which wets the two materials with setting plastic material.

FIG. 2 illustrates how the web 9 and the strands 10 are conveyed to the mandrel 1 over the foam plastic profile 8 and the inner layer consisting of the webs 4 and 5. The roller 6 conveys plastic material from the vessel 7 during rotation in the direction of the arrow 14 and, by increasing the peripheral speed of the roller to more than the speed of feed of the web 9 and strand 10, a pressure front is built up at 15, so that sufficient plastic material is conveyed to impregnate the webs and strands.

Figure 3:
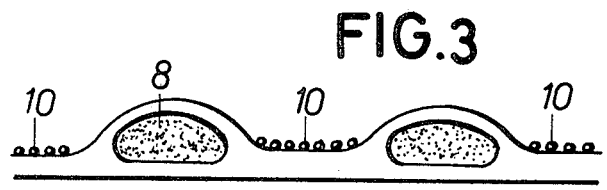
FIG. 3 is a section through the wall of a finished tube according to the invention.

In the section through a finished tube wall, as illustrated in FIG. 3, it may be seen how the foam plastic profile 8 has expanded so that pronounced exterior ribs appear on the tube. Furthermore, it will be clear how the roving 10 is located between the crests of the corrugations on the tube. An undamaged fibre web is disposed on the actual corrugation crests so that great annular rigidity is ensured in the finished product.

Having described my invention, I claim:

1. A method of manufacturing a ribbed tube comprising: applying to a rotating mandrel a reinforcing web impregnated with settable plastic material to form an inner layer on the mandrel; helically winding a strip of resilient foamed plastic material about said inner layer to form spaced apart convolutions; winding around said inner layer an outer layer of reinforcing web impregnated with settable plastic material together with reinforcing strands which lie between the convolutions of the foamed plastic strip while simultaneously pressing the plastic strip flat, the flattened plastic strip subsequently expanding after application of said outer layer to form external ribs on the tube before setting of the settable plastic material.

2. A method as claimed in claim 1, in which the strip of resilient foamed plastics material is applied over the inner layer by means of a roller which conveys plastics impregnating material from a bath, the roller being maintained in bearing relationship against the inner layer so that air is pressed out of the foamed plastics strip.

3. A method as claimed in claim 1 in which a further web is applied to the radially outer surface of the tube and is not dissolved by the action of settable plastics material.

References Cited

UNITED STATES PATENTS 2,825,365  3/1958  Meyers et al. _____ 156—171 X

RALPH S. KENDALL, Primary Examiner

U.S. Cl. X.R.

138—144; 156—195, 143